United States Patent [19]
Luvison et al.

[11] 3,978,435
[45] Aug. 31, 1976

[54] DIGITAL EQUALIZER FOR DATA-TRANSMISSION SYSTEM

[75] Inventors: Angelo Luvison, Turin; Giancarlo Pirani, Genoa, both of Italy

[73] Assignee: CSELT - Centro Studi e Laboratori Telecomunicazioni SpA, Turin, Italy

[22] Filed: Apr. 28, 1975

[21] Appl. No.: 572,335

[30] Foreign Application Priority Data
Apr. 26, 1974 Italy................................. 68312/74

[52] U.S. Cl.................................. 333/18; 325/42; 325/323
[51] Int. Cl.².......................................... H04B 3/04
[58] Field of Search...................... 333/18; 328/167; 325/42, 65, 473, 477, 323

[56] References Cited
UNITED STATES PATENTS

| | | | |
|---|---|---|---|
| 3,283,063 | 11/1966 | Kawashima et al................ | 333/18 X |
| 3,657,669 | 4/1972 | Proakis................................. | 333/18 |
| 3,659,229 | 4/1972 | Milton ................................. | 333/18 |

*Primary Examiner*—Paul L. Gensler
*Attorney, Agent, or Firm*—Karl F. Ross; Herbert Dubno

[57] ABSTRACT

Incoming data pulses from a transmission channel are differentially combined with weighted data pulses from preceding cycles to form an updating signal fed in parallel to a multiplicity of weighting circuits for digital multiplication with respective coefficients $K_1 - K_N$, the output signals from these weighting circuits being synthesized in staggered relationship to form a composite signal fed to a quantizing decoder. The weighting coefficients $K_1 - K_N$ are continuously modified under the control of an error signal derived from a locally generated reference code during an acquisition phase and from the decoder output during an operating phase.

10 Claims, 3 Drawing Figures

DIGITAL EQUALIZER FOR DATA-TRANSMISSION SYSTEM

FIELD OF THE INVENTION

Our present invention relates to an equalizer for digital messages designed to be inserted between a channel for high-speed data transmission and a load receiving the transmitted data.

BACKGROUND OF THE INVENTION

In the transmission of digital data on a telephone channel, for example, signal degradation generally occurs on account of thermal noise and interference between adjoining data pulses which may partly overlap, especially if transmission speeds are high. To minimize such distortion, use is conventionally made of filtering networks known as equalizers which are designed to flatten the amplitude characteristic and to linearize the phase characteristic of the transmission channel. Such conventional equalizers, consisting of cascaded passive phase shifters, are based upon the structural characteristics of the signal path and cannot take into account certain factors arising only in operation.

More recent developments, therefore, include the design of adjustable equalizers of the so-called "transverse-filter" type with a response characteristic adaptable to existing operating conditions. These equalizers are put through two successive phases, i.e. a preliminary or acquisition phase and a subsequent operational or working phase. In the acquisition phase the equalizer rapidly adjusts itself, on the basis of a series of predetermined test codes transmitted over the channel and identical reference codes generated locally at the receiving end, while during the working phase it follows the gradual changes in transmission characteristics in response to an error signal fed back from a signal-regenerating unit in its output. Such a signal regenerator, which may be referred to as a decision network, quantizes the data pulses issuing from the equalizer according to predetermined levels of pulse magnitude; the detected differences between the quantized levels and the actual output signal serve for the automatic adjustment of the parameters of the equalizer in a sense tending to reduce the error signal to zero.

Such dynamic equalizers operate generally satisfactorily in the case of relatively low pulse cadences, with little or no superposition of adjoining data pulses; they are not very effective against noise distortion which, e.g. in communication systems utilizing tropospheric or ionospheric channels, can assume greater significance than intercharacter interference. Moreover, their initial adjustment at the start of communication or following temporary loss of signal is relatively slow, calling for a lengthy acquisition phase.

OBJECT OF THE INVENTION

The object of our present invention, therefore, is to provide an improved dynamic equalizer for the purpose set forth which avoids the aforestated drawbacks and which can be used with a variety of digital transmission systems employing amplitude modulation, phase-shift keying or a combination thereof as well as multilevel linear coding, with various modes of transmission including both single and double sideband.

SUMMARY OF THE INVENTION

We realize this object, in accordance with out present invention, by the provision of an equalizer having a data input for incoming pulses as well as a multiplicity of branch leads each provided with adjustable weighting means. The data input and the branch leads are connected to a summing circuit which algebraically combines an incoming data pulse with weighted pulses from the several branch leads to form an updating signal fed in parallel to all these leads. The branch leads are further connected to a synthesizing circuit which additively combines their weighted pulses, derived from the updating signal, into a composite signal. Another summer, acting as a comparison circuit, is connected to the synthesizing circuit and to a source of reference signals, specifically to a local code generator during the acquisition phase and to a quantizing decoder during the working phase, for deriving an error signal from the aforementioned reference and composite signals; with the aid of arithmetic means connected to the comparison circuit, this error signal is translated into a control signal fed to the weighting means for adjusting same so as to vary the magnitude of the weighted pulses in a sense tending to reduce the error signal.

According to a more specific feature of our invention, the synthesizing circuit comprises a multiplicity of cascaded delay networks respectively inserted in the several branch leads downstream of their weighting means, each branch lead other than the first one containing an adder at a junction between its weighting means and its delay network connected to the output of the immediately preceding delay network.

According to a further feature of our invention, the updating signal is delivered to the weighting means of the several branch leads through a shift register having a stage output for each of these leads, the updating signal progressing through the shift register in counterflow to the weighted pulses passing through the cascaded delay networks whose delay time equals the time of transfer from one register stage to the next.

BRIEF DESCRIPTION OF THE DRAWING

The above and other features of our invention will now be described in detail with reference to the accompanying drawing in which.

SPECIFIC DESCRIPTION

Figure 1:
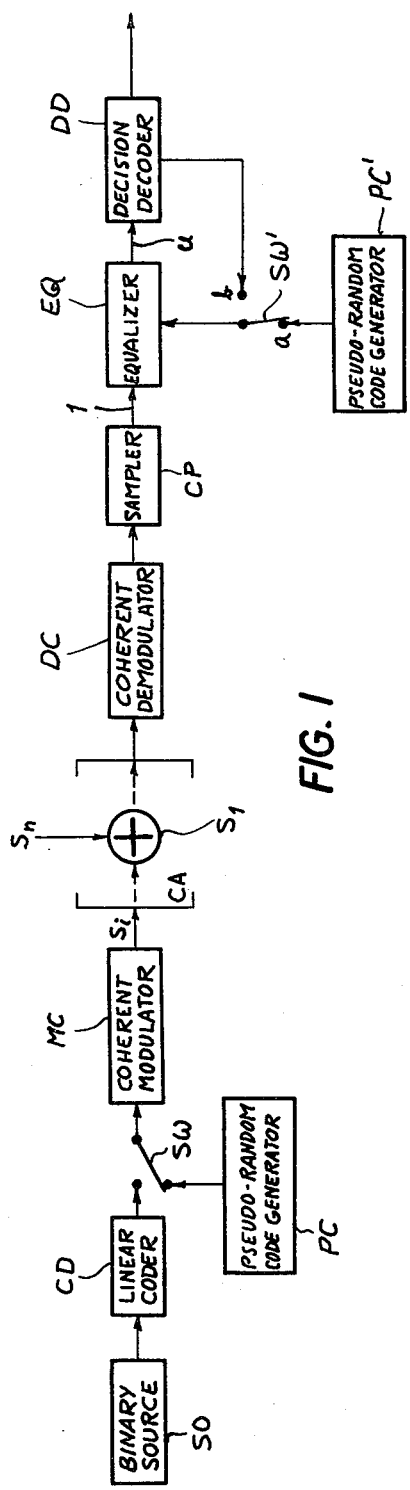
FIG. 1 is an overall view of a communication system including an equalizer according to our invention.

In FIG. 1 we have shown a communication system for the transmission of binary messages originating at a source SO which works into a linear coder CD of conventional type. A coherent modulator MC, receiving a carrier wave from a nonillustrated oscillator, modulates that carrier with the output of coder CD in the normal operating position of a switch SW and with code words from a pseudo-random code generator PC in the alternate position of that switch, i.e. during an acquisition phase. The resulting signals $s_i$ are fed to a transmission channel CA symbolically represented as including a summing circuit $S_1$ in which random noise $s_n$ is superimposed upon the signals $s_i$. At the receiving end, the signals are detected in a coherent demodulator DC which is periodically sampled in a circuit CP at a bit rate $1/\tau$. The series of bits are supplied on a line 1 to an equalizer EQ according to our invention, of the recursive-filter type more fully described hereinafter, whose output pulses $u$ reach a decision circuit or quantizing decoder DD designed to reconstitute the message signals from source SO as is well known per se. In the acquisition phase, equalizer EQ receives via a switch SW' a sequence of codes from an output lead $a$ of another pseudo-random code generator PC' synchronized with generator PC at the transmitting end. During steady-state operation, i.e. in the working phase, switch SW' feeds back the quantized pulses on an output lead $b$ of decoder DD to equalizer EQ.

Figure 2:
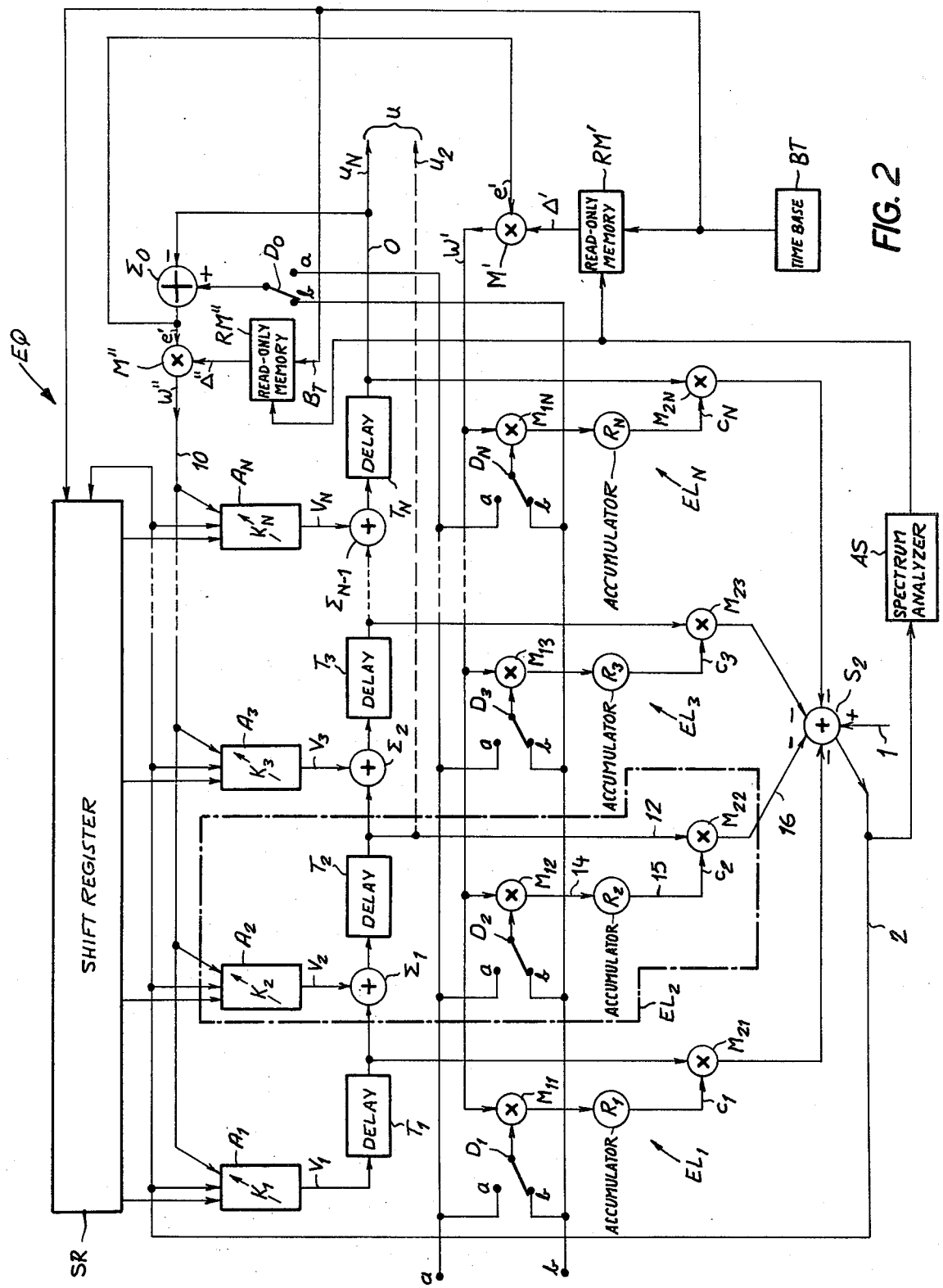
FIG. 2 is a circuit diagram of the equalizer of FIG. 1.

The construction of the equalizer EQ has been illustrated in FIG. 2 and is based upon our analysis of an algorithm of recursive filtration described by R. E. Kalman in an article entitled "A New Approach to Linear Filtering and Prediction Problems," Journal of Basic Engineering/Transactions of the ASME, March 1960. The article deals with the regeneration of signals of predetermined and time-invariant characteristics subject to noise and distortion in a dynamic system. The application of this theory to communication systems is discussed by H. Kaufman and R. E. Lawrence in an article entitled "The Kalman Filter For the Equalization of a Digital Communication Channel", IEEE, Transactions on Communication Technology, Vol. COM-19, December 1971. According to the latter article, an output signal may be synthesized from staggered constituents derived from an incoming data pulse and from data pulses received in preceding cycles, these constituents being weighted by respective coefficients $K_1, K_2, \ldots K_N$ to satisfy certain equations defining the current state of the signal. These constant coefficients $K_1$ etc. are determined by the structural characteristics of the communication channel in question.

We have found, in accordance with our present invention, that improved performance is obtained by varying the coefficients $K_1$ etc. as functions of certain channel parameters $c_1, c_2, \ldots c_N$ depending on statistical signal and noise properties, under the control of an error signal derived during the acquistion phase from the local code generator pc' and in the working phase from the output of decoder DD and under the further control of an updating signal obtained from the recursive filter.

The equalizer EQ shown in FIG. 2 comprises a summing circuit $S_2$ with an additive input receiving incoming data pulses from line 1 and with several subtractive inputs receiving weighted pulses from respective equalizer stages $EL_1, EL_2, EL_3, \ldots EL_N$. The output of summer $S_2$ is fed on a lead 2 as an updating signal to a multiplicity of weighting circuits $A_1, A_2, A_3, \ldots A_N$ forming part of the aforementioned equalizer stages. These circuits energize respective branch leads $v_1, v_2, v_3, \ldots v_N$ extending through respective delay networks $T_1, T_2, T_3, \ldots T_N$ to the next-higher stages and, in the case of the last stage $EL_N$, to an outgoing line 0 carrying composite signals $u_N$. Alternatively, the output signals of the equalizer could also be derived from one of the preceding stages, as particularly illustrated at $u_2$ for stage $EL_2$; the choice can be determined empirically from a comparison of the several stage outputs. The selected stage lead delivers the final output signal $u$ to decoder DD, FIG. 1, for quantization and regenerative retransmission via lead $b$ in parallel with a nonillustrated receiver. Networks $T_1 - T_N$ have delay periods equal to a sampling interval or clock cycle $\tau$.

The individual stage outputs from delay networks $T_1$ etc. are also delivered to respective digital multipliers $M_{21}, M_{22}, M_{23}, \ldots M_{2N}$, along with channel coefficients $c_1, c_2, c_3, \ldots c_N$ derived from respective accumulators $R_1, R_2, R_3, \ldots R_N$ with input connections to other digital multipliers $M_{11}, M_{12}, M_{13}, \ldots M_{1N}$, respectively. The latter multipliers are supplied in parallel, by way of respective switches $D_1, D_2, D_3, \ldots D_N$, with reference pulses of code generator PC' via lead $a$ in the acquisition phase and with quantized pulses from decoder DD via lead $b$ in the working phase; they further receive a control signal W' from a multiplier M' as more fully described hereinafter. Accumulators $R_1 - R_N$ store the sum total of corrective pulses, of either polarity, previously received from multipliers $M_{11} - M_{1N}$.

Each equalizer stage except the first one also includes a digital adder $\Sigma_1, \Sigma_2, \ldots \Sigma_{N-1}$, of the same general type as summing circuits $S_1$ and $S_2$, combining the instantaneous outputs of the associated weighting circuits $A_2 - A_N$ with the delayed outputs of their respective predecessor stages. Signal $u_N$ on lead 0 is therefore synthesized, in staggered fashion, from a multiplicity of components derived from the several weighting circuits $A_1 - A_N$ whose variable multiplication factors constitute the aforementioned weighting coefficients $K_1, K_2, K_3, \ldots K_N$. These weighting coefficients are determined by a control signal W'' issuing from a digital multiplier M'' which, like multiplier M', receives an error signal $e'$ from a summing circuit $\Sigma_0$. This summing circuit has a first input connected to lead 0 and a second input alternately connectable, by a switch $D_0$ ganged with switches $D_1 - D_N$, with lead $a$ (in the acquisition phase) or lead $b$ (in the working phase).

Multipliers M' and M'' also receive respective modifying factors $\Delta'$ and $\Delta''$ from a pair of read-only memories RM' and RM'' which are stepped by clock pulses from a time base BT under the control of a spectrum analyzer AS whose input is connected to lead 2. The readout of the modifying factors $\Delta'$ and $\Delta''$ from memories RM' and RM'' is stopped whenever the signal on lead 2, picked up by analyzer AS, has the character of white noise.

Figure 3:
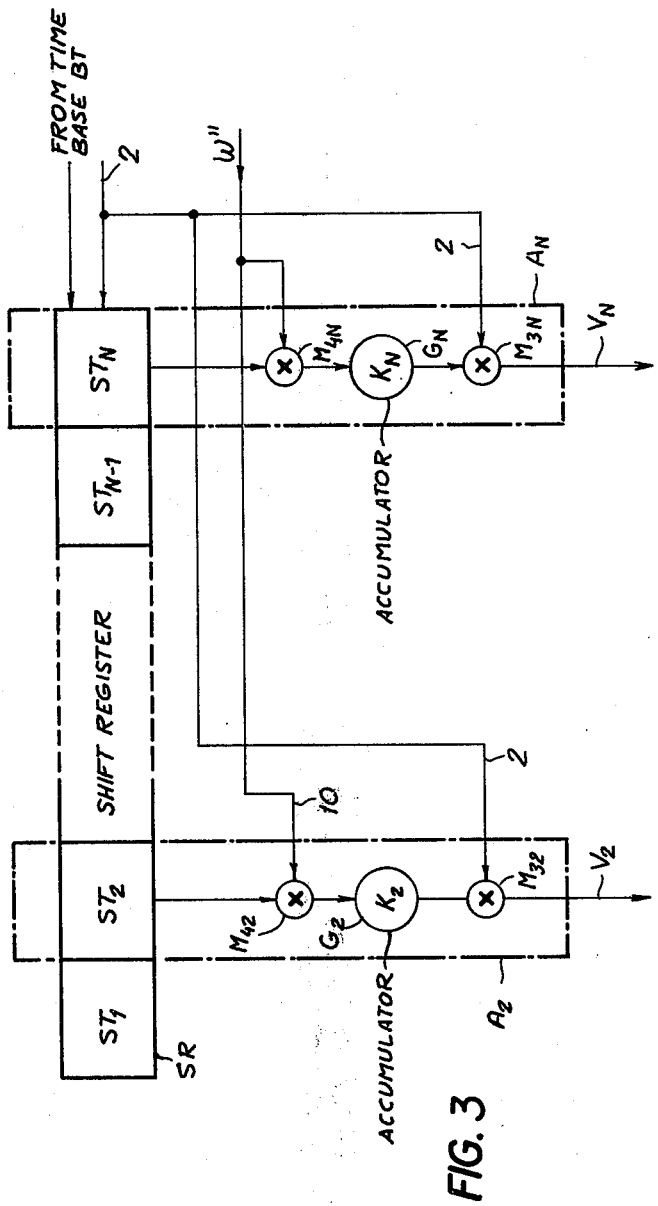
FIG. 3 is a more detailed diagram of certain components of the equalizer shown in FIG. 2.

Details of weighting circuits $A_2$ and $A_N$, representative of the homologous amplifiers of the other stages, have been shown in FIG. 3. An N-stage shift register SR, also indicated in FIG. 2, is loaded from the side of its Nth stage $ST_N$ with the updating signal appearing on lead 2, that signal traveling through the several register stages so as to reach the corresponding circuits $A_N - A_1$ during successive clock cycles $\tau$. The weighting circuits $A_2$ and $A_N$ particularly illustrated in FIG. 3 comprise respective multipliers $M_{42}$ and $M_{4N}$, receiving the control signal W'' via a lead 10 along with the instantaneous readings of the associated shift-register stages $ST_2$ and $ST_N$, which work into respective accumulators $G_2$ and $G_N$ whose operation is similar to that of accumulators $R_1 - R_N$ referred to above. Accumulators $G_2$ and $G_N$ store the weighting coefficients $K_2$ and $K_N$ which are fed to respective multipliers $M_{32}$ and $M_{3N}$ also receiving the updating signal on lead 2, in real time, from summer $S_2$. Branch leads $v_2$ and $v_N$ originate at multipliers $M_{32}$ and $M_{3N}$, respectively.

Weighting circuits $A_1 - A_N$ may be regarded as digital multipliers with a variable gain represented by coefficients $K_1 - K_N$.

In a simplified system, the modulating factors $\Delta'$ and $\Delta''$ could have fixed values instead of being selectable from among a multiplicity of such values stored in a memory as described above. These values, in either case, are so chosen as to let the coefficients $c_1 - c_N$ and $K_1 - K_N$ converge toward predetermined limits as the error signal $e'$ tends toward zero.

In the embodiment herein disclosed, weighting coefficients $K_1$ etc. are derived from the error signal $e'$ in a manner analogous to the derivation of channel coefficients $c_1$ etc. It is also possible to obtain each weighting coefficient directly from the associated channel coefficient by means of a suitable arithmetic unit connected to equalizer EQ.

The system according to our invention optimizes signal reception by reducing the mean squared value of signal deviation to a minimum.

We claim:

1. An equalizer for digital messages insertable between a transmission channel and a load, comprising:
   a data input for incoming pulses;
   a multiplicity of branch leads;
   adjustable weighting means in each of said branch leads;
   summing means connected to said data input and to said branch leads for algebraically combining an incoming data pulse with weighted pulses from said branch leads to form an updating signal fed in parallel to said branch leads for yielding said weighted pulses;
   synthesizing means connected to said branch leads for additively combining said weighted pulses into a composite signal;
   comparison means connected to a source of reference signals and to said synthesizing means for deriving an error signal from said reference and composite signals; and
   arithmetic means connected to said comparison means for translating said error signal into a control signal fed to said weighting means for adjusting same to vary the magnitude of said weighted pulses in a sense tending to reduce said error signal.

2. An equalizer as defined in claim 1 wherein said synthesizing means comprises a multiplicity of cascaded delay networks respectively inserted in said branch leads downstream of said weighting means thereof, and adding means in each branch lead other than the first one connecting a junction between the weighting means and the delay network thereof to the output of the immediately preceding delay network.

3. An equalizer as defined in claim 2 wherein each of said branch leads further includes additional weighting means downstream of said delay network thereof for multiplying the delayed weighted pulses with a coefficient independent of said updating signal prior to transmission of the weighted pulse to said summing means.

4. An equalizer as defined in claim 2, further comprising a shift register with a multiplicity of stages having outputs respectively connected to the weighting means of said branch leads in reverse order, the last stage output being connected to the first branch lead, the first stage having an input connected to said summing means for receiving said updating signal therefrom for successive transmission to all said weighting means via respective stages in counterflow to the progress of the weighted pulses through said cascaded delay networks.

5. An equalizer as defined in claim 4, further comprising stepping means for advancing said updating signal from one stage of said shift register to the next at intervals equaling the delay time of said networks.

6. An equalizer as defined in claim 4 wherein said arithmetic means includes first multiplier means connected to said comparison means for receiving said error signal and storage means for delivering a modification factor to said first multiplier means to generate said control signal in the output thereof, said weighting means comprising second multiplier means connected to the associated stage output and to said first multiplier means for forming the digital product of said control signal and the delayed updating signal.

7. An equalizer as defined in claim 6 wherein said weighting means further comprises accumulating means connected to said second multiplier means for receiving said digital product, and third multiplier means with input connections to said accumulator means and to said summing means for digitally multiplying an algebraic sum of successive digital products with said updating signal to produce a weighted pulse.

8. An equalizer as defined in claim 7 wherein said storage means comprises a memory with a multiplicity of modification factors stored therein, said arithmetic means further including a spectrum analyzer with an input connection to said summing means and with an output connection to a stepping input of said memory for reading out successive modification factors therefrom until said updating signal substantially has the spectrum of white noise.

9. An equalizer as defined in claim 1 wherein said source of reference signals comprises a local code generator and wherein said load includes a quantizing decoder, further comprising switchover means for connecting said comparison means to said code generator during an acquisition phase and to said decoder during a working phase.

10. An equalizer as defined in claim 9 wherein said synthesizing means has an output lead for delivering said composite signal to said decoder.

* * * * *